(12) United States Patent
Priesterjahn et al.

(10) Patent No.: US 11,068,579 B2
(45) Date of Patent: Jul. 20, 2021

(54) METHOD AND SYSTEM OF PERFORMING AN AUTHORIZATION MECHANISM BETWEEN A SERVICE TERMINAL SYSTEM AND A HELPDESK SYSTEM

(71) Applicant: Wincor Nixdorf International GmbH, Paderborn (DE)

(72) Inventors: Steffen Priesterjahn, Paderborn (DE); Dirk Luebeck, Offenbach (DE)

(73) Assignee: Wincor Nixdorf International GmbH, Paderborn (DE)

(*) Notice: Subject to any disclaimer, the term of this patent is extended or adjusted under 35 U.S.C. 154(b) by 148 days.

(21) Appl. No.: 16/028,032

(22) Filed: Jul. 5, 2018

(65) Prior Publication Data
US 2019/0012453 A1    Jan. 10, 2019

(30) Foreign Application Priority Data
Jul. 6, 2017    (EP) .................................... 17179978

(51) Int. Cl.
*G06F 21/43* (2013.01)
*G07F 19/00* (2006.01)
*H04L 29/06* (2006.01)
*H04W 12/08* (2021.01)
*H04L 12/24* (2006.01)

(52) U.S. Cl.
CPC .............. *G06F 21/43* (2013.01); *G07F 19/20* (2013.01); *G07F 19/209* (2013.01); *H04L 41/5074* (2013.01); *H04L 63/0838* (2013.01); *H04L 63/10* (2013.01); *H04W 12/08* (2013.01)

(58) Field of Classification Search
CPC ........ G06F 21/43; G07F 19/20; G07F 19/209; H04L 41/5074; H04L 63/0838; H04L 63/10; H04W 12/08
See application file for complete search history.

(56) References Cited

U.S. PATENT DOCUMENTS

| | | | |
|---|---|---|---|
| 5,321,242 A | 6/1994 | Heath, Jr. | |
| 7,403,959 B2* | 7/2008 | Nishizawa | ........ G06F 16/24568 |
| 9,256,646 B2* | 2/2016 | Deshmukh | ............ G06F 16/245 |
| 9,262,479 B2* | 2/2016 | Deshmukh | ........ G06F 16/24568 |
| 9,390,135 B2* | 7/2016 | Alves | ................ G06F 16/24565 |
| 9,515,965 B2* | 12/2016 | Branson | ............. H04L 49/9084 |

(Continued)

OTHER PUBLICATIONS

Search report issued in the corresponding European application; 7 pages.

*Primary Examiner* — Yonas A Bayou
(74) *Attorney, Agent, or Firm* — Black, McCuskey, Souers & Arbaugh LPA

(57) ABSTRACT

A method of performing an authorization mechanism between a service terminal system (ATM) and a helpdesk system (HD) includes the steps of: sending a request message (RQ) comprising a one-time code (CL), an identifier (CN) for the ATM and a set of access right data (TD) about rights for using the (ATM) by a user (TN); creating a response message (RS) by using the CL, TD, and an ident key (TK) derived from an operation on the CN and a base key (BK), the BK being a common secret of both, the HD and the ATM; sending the RS; creating a reference response message (RS*) by using the CL, the TD, and the TK; and comparing the RS with the RS* to authorize the TN to use the ATM according to the rights being represented by the TD.

10 Claims, 4 Drawing Sheets

(56) References Cited

U.S. PATENT DOCUMENTS

| | | | |
|---|---|---|---|
| 9,715,561 B2* | 7/2017 | Bareness | G06F 16/24568 |
| 2009/0019198 A1* | 1/2009 | Konik | G06F 16/2455 |
| | | | 710/59 |
| 2009/0106214 A1* | 4/2009 | Jain | G06F 16/24568 |
| 2012/0166421 A1* | 6/2012 | Cammert | G06F 16/24575 |
| | | | 707/718 |
| 2012/0314862 A1 | 12/2012 | Min | |
| 2013/0198166 A1* | 8/2013 | Prout | G06F 16/24524 |
| | | | 707/718 |
| 2014/0222523 A1* | 8/2014 | Vairavan | G06Q 10/0637 |
| | | | 705/7.36 |
| 2016/0104140 A1* | 4/2016 | Harrow | G06F 21/35 |
| | | | 705/42 |
| 2017/0006026 A1* | 1/2017 | An | H04L 63/10 |

* cited by examiner

Get Challenge and Base Information — CN

Computer Name __MyComputer__

Phone      +49 5251 693 4976    [GET CHALLENGE]

Challenge   AA BB CC DD EE FF 00 11 — CL

Adjust Activity Period

Duration                                  − 60 min +

Reboots                                     − 5 +   } TD

Unblock Time Manipulation                 ⊙⎯

1. GET CHALLENGE    2. ENTER ACTION    3. ENTER RESPONSE

Fig. 3a

Access Protection

Switch Autologon User                 [none ▼]

Disable Keyboard & Mouse Blocking        ⎯⊙   } TD

Intrusion Protection

Switch to Unprotected Mode                 ⎯⊙

1. GET CHALLENGE    2. ENTER ACTION    3. ENTER RESPONSE

Fig. 3b

1. Load BaseKey
Base Key [C:/Temp/helpdesk/basekey.hdk] [Load...]

2. Enter Challenge & Sytem Name
Challenge [12 34 56 78 ab cd ef] ⟵ CL
Computer Name [MyComputer] ⟵ CN

3. Enter Activity Period
☑ Duration [60 minutes]
☑ Number of Reboots [10 reboots]

4. Enter Intrusion Protection Options
Switch to Installer Mode [ I ]

5. Enter Access Protection Options
Switch Autologon User [ O ]
Autologon User [          ]

6. Enter Miscellaneous Options
Automatic Reboots [ O ]
Unblock Time Manipulation [ O ]

7. Provide Response
RS
5C A4 21 D4 F9 2B 51 85

Five Charlie Alfa Four
Two OneDelta Four
Foxtrot Nine Two Bravo
Five One Eight Five verify succeeded
Algorithm Version: 1

| 1 | 2 | 3 | A | B |
| 4 | 5 | 6 | C | D |
| 7 | 8 | 9 | E | F |
| 0 |

[OK]  [CLEAR]

1. GET CHALLENGE    2. ENTER ACTION    3. ENTER RESPONSE

Fig. 3d

METHOD AND SYSTEM OF PERFORMING AN AUTHORIZATION MECHANISM BETWEEN A SERVICE TERMINAL SYSTEM AND A HELPDESK SYSTEM

CROSS-REFERENCE TO RELATED APPLICATIONS

This application claims priority to and the benefit of European Patent Application EP17179978.6 filed Jul. 6, 2017, the contents of which are hereby incorporated by reference in their entirety.

BACKGROUND AND SUMMARY

The invention relates to a method and a system of performing an authorization mechanism between a service terminal system and a helpdesk system, in particular to a system wherein the service terminal system is a service-terminal or automated teller machine, which is subject of maintenance work.

Such a system is disclosed by EP 2 849 142 A1 describing a method and equipment for providing a smartphone-assisted maintenance of a self-service terminal. In particular, the document describes a method and a system that are provided for maintaining a self-service terminal, wherein the maintenance is effected using a mobile terminal, such as a smartphone. A server application that can communicate first via a communication link with a terminal application that is executed on the mobile terminal and second via a network connection with the self-service terminal is executed on a server. Direct communication between the mobile terminal and the self-service terminal is not necessary. The mobile terminal uses a still picture production apparatus to capture both an identifier for the self-service terminal and an identifier for a maintained component of the self-service terminal, and transmits corresponding data to the server. On the basis of this, the server application can ascertain update data and communicate them to the self-service terminal. Thus, identifying hardware the document describes to send identifiers (e.g. for self-terminal and the maintained component) via a mobile communications link. However, the document does not address the problem of performing an authorization mechanism to allow or deny users/maintenance personnel to perform certain applications at the self-service terminal.

It is known in general for enhancing maintenance in a network environment to provide a helpdesk ticketing-system. However, it would be desirable to have a ticketless passcode mechanism, such as a challenge-response mechanism that enables access rights on the terminal system without the need to create the actual ticket and copy it to the client's system. More generally, it would be desirable to provide a ticketless method and system of performing an authorization mechanism between a service terminal system and a helpdesk system.

The problem is solved by a method comprising the features recited in the claims and by a system comprising the features recited in the claims.

Accordingly, the present invention provides a method of performing an authorization mechanism between a service terminal system (e.g. an automated teller machine) and a helpdesk system comprising the steps of:

Sending from the service terminal system or a user (e.g. a technician) a request message to the helpdesk system or to an operator thereof, the request message comprising a one-time code (e.g. a challenge), an identifier for the service terminal system and a set of access right data about rights for using said service terminal system by said user;

Creating at the helpdesk system a response message by using the one-time code, the right data and an ident key derived from an operation on the identifier and a base key, the base key being a common secret of both, the helpdesk system and the service terminal system;

Sending from the helpdesk system or the operator thereof said response message to the service terminal system or to the user thereof;

Creating at the service terminal system a reference response message by using the one-time code, the right data and the ident key derived thereof; and Comparing at the service terminal system the response message with the reference response message to authorize the user to use the service terminal system according to the rights being represented by said access right data.

The system provided by the present invention comprises said service terminal system and said helpdesk system, wherein the system is configured to execute said method of performing an authorization mechanism, as follows:

the user sends or the service terminal system is configured to send said request message to the helpdesk system or to the operator;

the helpdesk system is configured to create said response message;

the operator sends or the helpdesk system is further configured to send said response message;

the service terminal system is configured to create said reference response message; and the service terminal system is further configured to compare the response message with the reference response message to authorize the user to use the service terminal system according to the rights being represented by said right data.

The invention also provides said service terminal system and said helpdesk system.

According to the claimed subject-matter of the independent claims, the invention provides a user-friendly method and system for performing a secure and advantageous authorization mechanism that helps the user/technician to ask by request for access to and authorization for performing maintenance work at the self-service terminal. The method can be understood to be a ticketless challenge-response mechanism, wherein the mechanism's security is qualified by a request message including at least three different and independent parameters, namely a one-time code (e.g. a challenge) which secures that the challenge-response can be performed only once, an identifier for the service terminal system which secures that the correct hardware is used, and right data which represent only those rights which can be authorized to the user/technician for using/maintaining said service terminal system. The user/technician does not need to use any password or hardware key (dongle) or the like to get full access to the helpdesk and to those components (HW and/or SW) of the service terminal which he/she is authorized to use. Moreover, the invention provides a secure authorization mechanism without the need to establish a ticketing system.

Preferred embodiments are characterized as follows.

The method of performing an authorization mechanism between the service terminal system and the helpdesk system can be enhanced by further providing that the request message from the terminal and/or the response message from the helpdesk is configured to be communicated via a public audio or text communications link, in particular a communications link providing phone calls, SMS, Email, and/or Instant Messaging. Accordingly, the user/technician can send his request (including said one-time code, said identifier for the service terminal system and said set of access right data, to the helpdesk/operator e.g. via phone as a manageable string of some hexagonal characters, e.g. 16 characters. The helpdesk/operators can answer with a response having the same or similar structure, e.g. 16 characters. Thus, the communication of request and/or response can be safely performed via public communications, i.e. by any standard device such as smartphone without running the risk of being hacked by eavesdropping.

Preferably, the one-time code is a random generated token or a challenge created by a random process being performed by the service terminal system, in particular on request of the user. This means that the challenge-response mechanism can be executed only once; more attempts are not allowed or can only be initiated by request of the user/technician asking for a new token/challenge. This makes the whole system resistant to fraud or manipulation attempts, such as brute force attacks.

For many applications, it is advantageous to have the ident key created as terminal key by helpdesk system in that the identifier is concatenated with the base key and the result is then processed by a hash function to obtain said terminal key. This means that the base key, as a common secret, can be stored in the helpdesk, whereas in the terminal the terminal key is stored being derived from said base key. Thus, no user or fraudster can directly read the common secret (base key) from the terminal. Beside this, the terminal as such is secured from access from outside.

Preferably, a session key is created by the helpdesk system in that the one-time code, in particular, the challenge, is concatenated with the terminal key and with the access right data, all being provided at the help desk system, and the result of the concatenation is then processed by a hash function to obtain said session key. This means that all characteristic data, namely the one-time code, the terminal key (derived from the base key) and the access right data are represented by a single key, the session key. Even if a fraudster would know the session key, he/she cannot decode this key to get the characteristic data.

Even more preferably, the response message is created by helpdesk system in that a portion of the session key, in particular the portion including the first N bytes (e.g. N=8), is extracted from the session key to represent said response message. Since the session key is created by a hash function, Applicant has found that it is sufficient to take only a portion from the session key, preferably the first N bytes, to have a nearly unambiguous representation of the session key and that this representation can be easily communicated as a response via a public communication link, such as a telephone line, a SMS, Email et cetera. Consequently, the operator of the helpdesk can easily communicate the response to the user/technician of the terminal. In a preferred embodiment, the response message is configured to be input by a human, such as the technician, into a man-machine-interface of the terminal.

At the terminal there is preferably created a reference session key in that the one-time code, in particular the challenge, is concatenated with the terminal key and with the access right data, all being provided at the service terminal system, and the result of the concatenation is then processed by a hash function to obtain said reference session key. This means that the terminal takes those characteristic data, namely the one-time code/challenge, the terminal key (both provided by the terminal) and the access right data (received from the user) to create a reference session key in analogous manner to that session key being created by the helpdesk.

Accordingly, the extract of this reference session key can be compared to the response received from the helpdesk in order to verify the validity of the response and thus authorize the user/technician to access the terminal according to those rights, which are admitted to be used by him/her.

The invention will now be described in detail by making reference to the attached schematic drawings.

BRIEF DESCRIPTION OF THE DRAWINGS

FIG. 3a-3d show screenshots of the man-machine interfaces while running an application performing said method on a terminal and a helpdesk.

DETAILED DESCRIPTION

Figure 1:
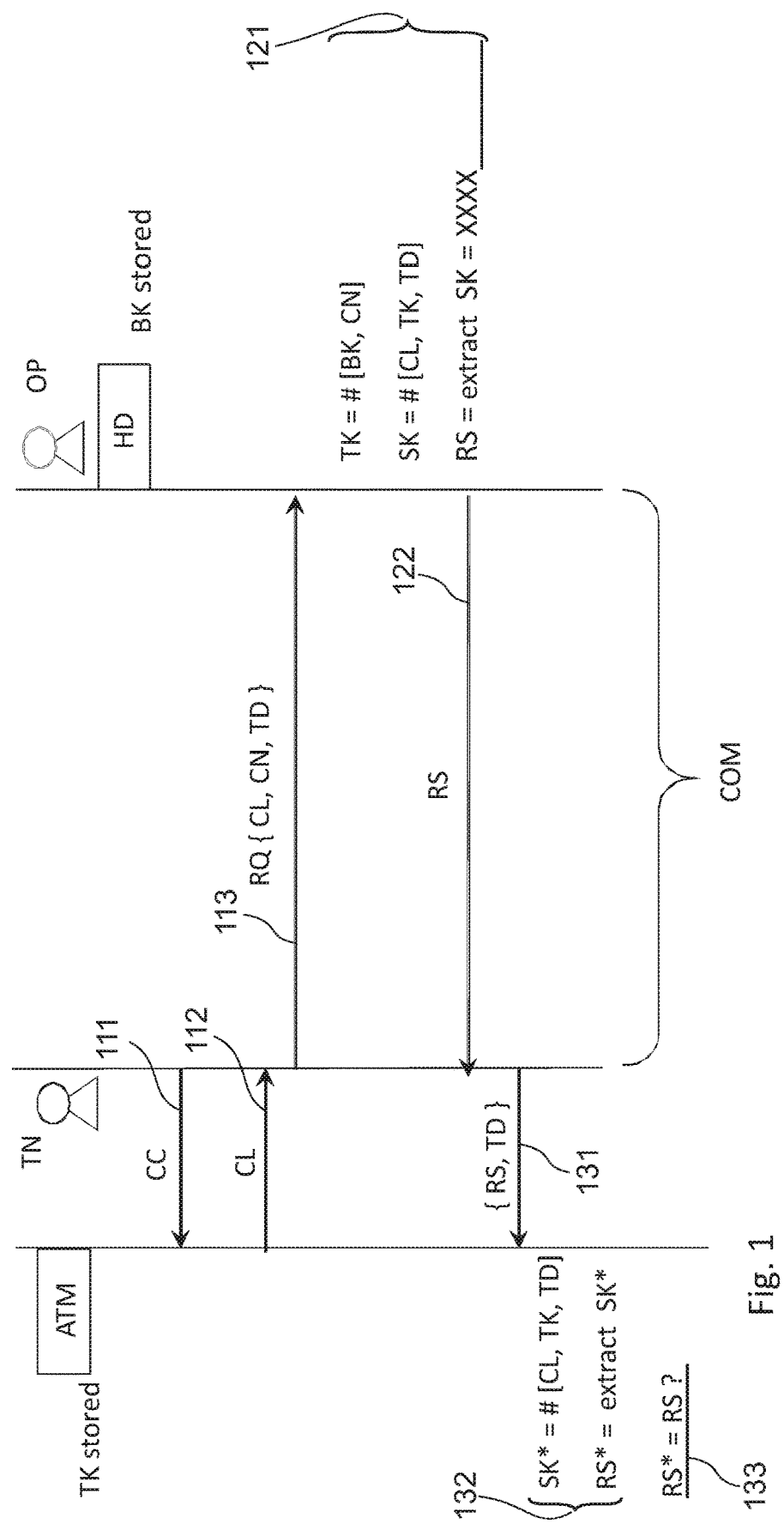
FIG. 1 shows a schematic overview of the system including a graphical representation of the steps being performed during the method of performing an authorization mechanism according to the present invention.

Referring to FIG. 1 there is shown in a schematic drawing a system comprising a service terminal system ATM for being used by a user TN and a helpdesk system HD for being operated by an operator OP. In the shown embodiment, the terminal system is an automated teller machine ATM, which shall be subject of a maintenance operation performed by a person/user who is a technician who stays in contact with the helpdesk, in particular with the operator OP thereof.

Figure 2:
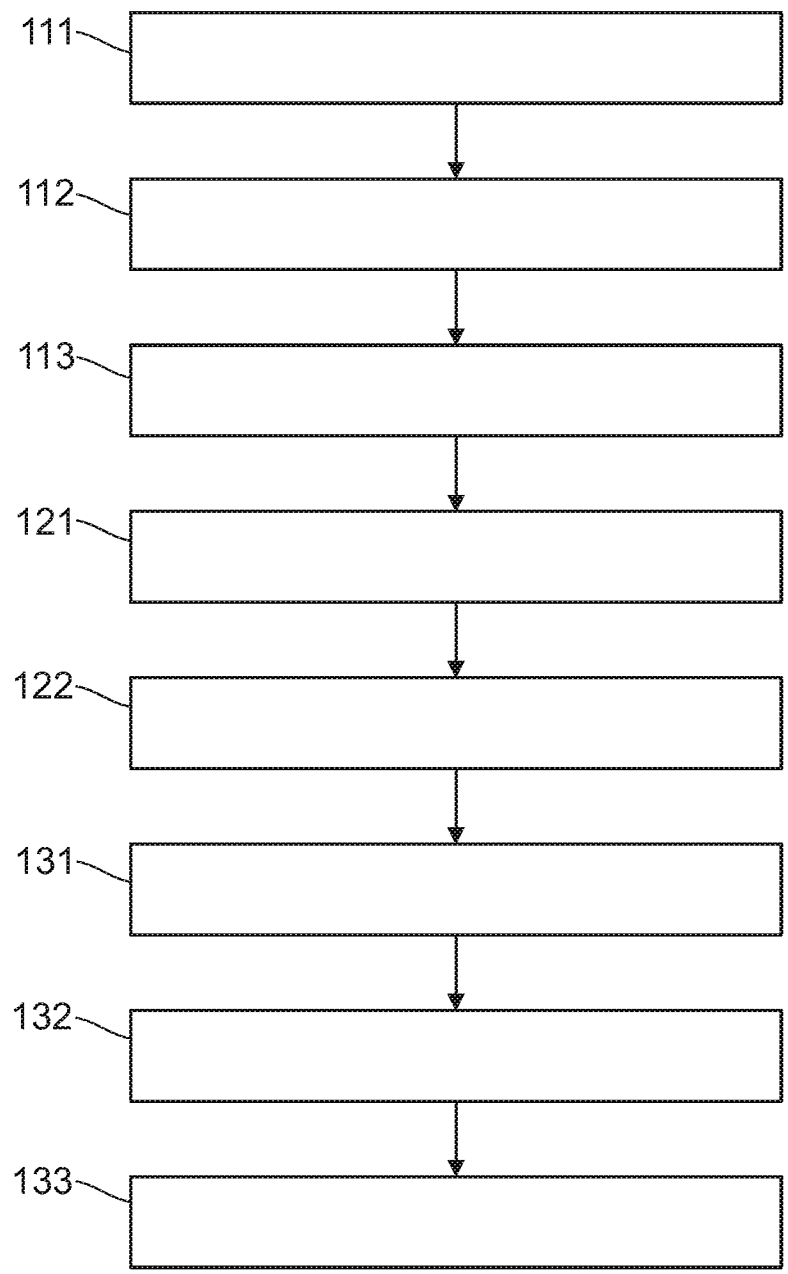
FIG. 2 shows a flowchart comprising the steps of said method.

The system is configured to execute a method of performing an authorization mechanism, as it will be explained in more detail by referring also to the flow chart of FIG. 2.

The method 100 starts with a step 111 wherein the user/technician TN triggers the terminal ATM to create a challenge/one-time code CL. The trigger CC or instruction in step 111 is called "Create Challenge". This step is also illustrated by FIG. 3a showing a graphical user interface (GUI) having a button "GET CHALLENGE" for executing the step 111. The challenge is then created in step 112 and displayed to the user. As it can be seen in FIG. 3a the challenge is just a string having 16 characters in hexadecimal format "AA BB CC . . . 11" and thus can easily be communicated by the user via any public communications link or service, such as phone line, SMS, instant messaging.

In step 113 (see FIGS. 1 and 2) the challenge CL is communicated together with other information to the helpdesk, namely with the computer name CN which is in ID for the terminal ATM and the so-called access right data TD. The data TD are also entered by the technician TN into the GUI at the terminal ATM (see FIGS. 3a and 3b). All these characteristic data CL, CN, and TD are communicated as a request message RQ from the technician TN to the operator OP of the helpdesk HD. In the preferred embodiment, the technician TN tells this data to the operator OP via a standard communications, such as a phone line.

After having received this request message RQ, the helpdesk HD can create the following keys.

In a step 121 there is created a terminal key TK in that the identifier/computer name CN is concatenated with the base key BK, which is actually the common secret between terminal ATM and helpdesk HD. Please note that the base key BK is stored at the helpdesk HD only, whereas the terminal key TK is stored at the terminal ATM. Moreover, also in step 121, the helpdesk creates a session key SK in that the one-time code/challenge CL is concatenated with the terminal key TK and with the right data TD and then the result of the concatenation is processed by a hash function. This is only a pre-step for obtaining the response message RS which is an extract of said session key SK. Preferably the first 8 bytes are taken which is sufficiently safe to nearly unambiguously represent the session key. And further to this, the obtained response message RS is quite short (e.g. 16 characters) so that it can be communicated to the terminal via any public communications link. In FIG. 3c the GUI for the operator OP at the helpdesk HD is shown to illustrate how the response RS is created. First, the base key is loaded from the helpdesk system. Then the operator OP inputs the data CL (challenge), CN (computer name), and those access right data TD which have been told him by the technician TN via phone. Then the helpdesk system HD can create the response RS as mentioned above. As it can be seen in FIG. 3c, the response RS is again a short 16 characters long string in hexadecimal format, here e.g. "5C A4 21 D4 F9 2B 51 85" which can be communicated via simple communication links.

Then in a step 122 the response message RS is communicated via such a link, in his example via the same phone line, to the user TN of the terminal system ATM.

The user/technician can then enter in step 131 said response RS (see also FIG. 3d showing the GUI at the terminal ATM) and further can enter the access right data TD which represent those right which the user aims to become authorized for use.

In the next step 132 the terminal ATM itself will create a reference session key SK* by using the known data CL (which was created by the ATM before in step 112) and TK (which is stored in the ATM) and further by the using the data TD inputted by the user. The resulting session key SK* then serves as a basis for extracting a reference response message RS* which should be (at best) identical to the received response message RS. Therefore, the terminal ATM makes a comparison of both responses RS* with RS in a step 133. If both responses are equal, the terminal ATM authorizes the user/technician to make use of the requested rights (represented by the set of access rights TD).

In the above described embodiment, the service terminal system is an automated teller machine ATM, which is under maintenance and the user is a technician TN who shall make maintenance work.

Of course, the system and method can be applied to any configuration where the operation of a terminal system shall be supported by a helpdesk. Thus, the service terminal system can also be e.g. a self-service terminal, a point-of-sale terminal, or the like.

Moreover, the helpdesk HD, when being asked for support, needs not to be operated by a person/operator OP. The helpdesk can also be configured to provide a roboter-like Input-Output (I/O) function that simulates a real person or operator.

In addition to the above the invention shall be further explained by the following considerations.

The disclosed system and method can also be characterized as a "ticketless authorization mechanism". This mechanism is based on a challenge-response mechanism that enables a set of access rights TD on the terminal system ATM without the need to create an actual ticket and copy it to the user's terminal system. To authorize the use and enabling the set of access right data TD a random generated token (the one-time code or challenge) combined with the access right's data is verified by a Helpdesk. The Helpdesk decides to authorize or refuse the requested access rights.

Reference is made again to FIG. 1: At first, a person, let's say a technician TN, at the terminal system ATM initiates the system to generate a challenge CL, which is short enough to be told using a telephone (also see FIGS. 3a and 3b).

Then, the technician TN calls the Helpdesk HD, identifies in a certain way, and tells the operator OP the challenge and all the data of the requested access rights (see RQ in FIG. 1).

The operator OP generates with the help of the helpdesk HD a response RS (also see FIG. 3c) using the session key SK and tells the technician TN the result.

There are many access right data/information the technician may need to tell the operator:

Computer name (may be in Unicode, may be already known by the operator)
Ticket duration (in minutes)
Number of reboots
Switch into the installer mode (yes/no)
Name of Auto-Logon-User if required
Automatic reboot after the ticket is accepted (yes/no)
Unblock time manipulation
Unblock keyboard filtering The above listed data can be understood to represent typical data being communicated in ticketing systems.

Further to these data the user/technician communicates also information such as:

Version number of the used mechanism (for future compatibility)
Challenge

Then the technician enters the response RS (also see FIG. 3d) and the access right data TD and the access is applied.

While conventional passcode systems offer a comfortable way to authorize a single permission, the ticketless authorization mechanism of the present invention goes much further. The response RS authorizes not only the permission, but also a set of access right attributes, secured by a cryptographic technique. The technician TN gets only the permission he/she asks for. The challenge CL and response RS are preferably each 16 characters long and coded hexadecimal. No check values need to be included. If the activation of the access rights TD fails because of typos, the whole process must be repeated from the beginning by creating a new challenge.

A generated challenge expires after 1 hour, after an attempt to activate the access (successful or not) and by a system's restart. Of course, the policy on the system should preferably permit the challenge-response-tool (dialog tool or command line tool) to be run. More advanced techniques to exchange the data between terminal system and helpdesk (just like QR-Codes, for example) could also be planned. Since the computer name CN is involved in the cryptographic techniques renaming the computer (e.g. after a system installation via disk image) needs a new configuration of the used base key. (Details see further below.)

As to the Implementation Preferred by the Applicant:

All cryptographic mechanism can preferably be implemented in C++ by using OpenSSL. Since there is no encryption and decryption of data needed, but only cryptographic checks, hashing is used instead of encryption and decryption. The hash algorithm SHA256 is preferably used by the applicant. The base key BK is e.g. a 256-bit random value generated by OpenSSL.

The BK is stored as a plain binary file on the Helpdesk HD (see FIG. 3c "Load Base Key"). The terminal system ATM stores a terminal key TK, derived from the BK. The TK is the hash of the BK concatenated with the computer name (Note that the BK is not stored by the ATM! If the computer is renamed the TK becomes invalid). For each access right authorization, the helpdesk HD generates first the TK using the BK and the computer name. In a next step the helpdesk generates the temporary session key SK. The SK is the hash of TK concatenated with the terminal's challenge and the data of the requested access rights TD. The response RS is the hexadecimal view of the first 8 bytes of the SK (16 characters). When the technician TN enters the access right data TD and the response RS (see FIG. 3d) then the terminal ATM generates the SK* in the same way like the helpdesk HD has generated the SK and compares the first 8 byte of the SK* (which is the reference response RS*) against the response RS.

As to the Applicant's Preferred Way of Generating the Base Key BK:

There is preferably an editor being extended to support the generation of the BK. The BK is stored as a plain binary file (*.hdk) and is added to the configuration. The editor should also be able to import an existing BK file into the configuration.

Further to this, there is an applicator, which extracts the BK from the configuration, creates the TK, and stores it as "terminal key" in the Terminal Security Store. A new key overwrites an existing key. If the configuration does not contain a BK, the applicator deletes an existing TK.

As to the Applicant's Preferred Embodiment of the Service Terminal System

On the terminal side, the application/program tsserv.exe is responsible for generation the challenge, verifying the response, applying the access rights and handling them.

tsctrl.exe is extended by three new commands:
get the challenge CL from tsserv.exe
pass the access right data TD and response RS to tserv.exe for verifying and for switching in access mode
open a dialog window to get the challenge CL and to enter access right data TD and response RS As a first step, a command line version is implemented in tsstrl.exe. For more user friendliness, a dialog mask can be implemented later on.

To support the integration in an external application (like a SOP) tsserv.exe will implement a command line with all necessary data for challenge generation, ticket data and verification can be given in one go. The calling application will need to parse the output result.

| | |
|---|---|
| getchallenge | This command returns the 32 bit random token in hexadecimal format. |
| startticket | This command, followed by a list of parameters, activates a ticket. Possible parameters are: |
| | -d, --duration    Duration in minutes |
| | -n, --reboots    Number of reboots |
| | -p, --unprotectedmode    Switch to Unprotected Mode |
| | -u, --autologonuser    AutoLogonUser |
| | -a, --autoreboot    AutomaticReboot |
| | -m, --resettimemanipulation    Reset time manipulation |
| | -k, --unblockmousekeyboard    Disable mouse and keyboard filtering |
| | -r, --response    16 characters response, hexadecimal format |
| Dialog | Opens a dialog window to get the challenge and to enter access right data and response. |

Additionally, a dialog will be implemented where the technician can enter the information.

In multiscreen systems the dialog automatically selects the appropriate screen (which is the largest screen which does not start with coordinates x,y at 0,0). Additionally, the coordinates of the screen can be set at the command line.

(also see Screenshots shown in FIG. 3a-d)
tsserv.exe
access the Store to extract the TK
generate the challenge and hold it in memory as long it is valid
verify access right data and response and apply the right/access As to the Applicant's Preferred Embodiment of the Helpdesk Tool The helpdesk tool (tshelpdesk.exe) can be implemented in C++ using QT for the user dialog and OpenSSL for cryptographic tasks.

Functionality:
Read BK-file
Display an input mask to enter the challenge CL, computer name CN and access right "ticket" data TD
Create TK and SK and display the response RS
(See Screenshot in FIG. 3c)

In summary, there is disclosed a method 100 of performing an authorization mechanism between a service terminal system ATM and a helpdesk system HD comprising the steps of:

Step 113: Sending a request message RQ comprising a one-time code CL, an identifier CN for the service terminal system ATM and a set of access right data TD about rights for using said service terminal system ATM by said user TN;

Step 121: Creating a response message RS by using the one-time code CL, the access right data TD and an ident key TK derived from an operation on the identifier CN and a base key BK, the base key BK being a common secret of both, the helpdesk system HD and the service terminal system ATM;

Step 122: Sending said response message RS;

Step 132: Creating a reference response message RS* by using the one-time code CL, the access right data TD and the ident key TK;

Step 133: Comparing the response message RS with the reference response message RS* to authorize the user TN to use the service terminal system ATM according to the rights being represented by said access right data TD.

What is claimed is:

1. A method of performing an authorization mechanism between a service terminal system and a helpdesk system comprising the steps of:
receiving, at the service terminal system, a request for a one-time code;
displaying, with a display of the service terminal system, the one-time code;
receiving, at the helpdesk system, a request message, the request message comprising the one-time code, an identifier of the service terminal system, and a set of access right data about rights in performing a maintenance operation on the service terminal system;
creating, at the helpdesk system, a response message in response to the request message by concatenating the one-time code, the set of access right data and an ident key, the ident key derived from an operation on the identifier of the service terminal system and a base key, the base key being held by the helpdesk system and not the service terminal system;
wherein said creating further comprises:
processing a result of the concatenation with a hash function to produce a hash, and
extracting only a portion of the hash as the entire response message;
sending, from the helpdesk system, the response message;
receiving, at the service terminal system, the response message with the set of access right data;
creating, at the service terminal system, a reference response message by:

concatenating the one-time code, the set of access right data received with the response message, and the ident key, processing a result of the concatenation of the one-time code, the set of access right data received with the response message, and the ident key with a hash function to produce a second hash, and extracting only a portion of the second hash as the entire reference response message; and confirming, at the service terminal system, identity between the response message and the reference response message to authorize a service technician to perform the maintenance operation the service terminal system according to the set of access right data.

2. The method of claim 1 wherein said sending the response message from the helpdesk system is further defined as:

sending, from the helpdesk system, the response message via a public audio or text communications link to a recipient other than the service terminal system.

3. The method of claim 1 wherein said displaying is further defined as:

displaying, with the display of the service terminal system, the one-time code as a text string of characters.

4. The method of claim 1 wherein said receiving the request message at the helpdesk system is further defined as:

receiving, at the helpdesk system, a request message, the request message comprising the one-time code, the identifier of the service terminal system, and the set of access rights data about performing the maintenance operation on the service terminal system, said receiving from a source other than the service terminal system.

5. The method of claim 1 wherein said sending the response message from the helpdesk system is further defined as:

sending, from the helpdesk system, the response message as a text string of characters.

6. The method of claim 1 wherein said receiving the response message at the service terminal system is further defined as:

receiving, at the service terminal system, the response message with the set of access right data from a source other than the helpdesk system.

7. The method of claim 1 wherein said extracting only the portion of the hash is further defined as:

extracting eight bytes of the hash as the entire response message.

8. The method of claim 1 wherein said receiving the request message at the helpdesk system is further defined as:

receiving, at the helpdesk system, the request message, the request message comprising the one-time code, the identifier of the service terminal system, and the set of access right data about performing the maintenance operation on the service terminal system, wherein the set of access right data includes a duration of the maintenance.

9. The method of claim 1 wherein said receiving the request message at the helpdesk system is further defined as:

receiving, at the helpdesk system, the request message, the request message comprising the one-time code, the identifier of the service terminal system, and the set of access right data about performing the maintenance operation on the service terminal system, wherein the set of access right data includes a number of reboots to occur during the maintenance.

10. The method of claim 1 wherein said receiving the response message at the service terminal system is further defined as:

receiving, at the service terminal system, the response message with the set of access right data through the display of the service terminal system.

\* \* \* \* \*